US009286828B2

(12) United States Patent
Yamamoto et al.

(10) Patent No.: US 9,286,828 B2
(45) Date of Patent: Mar. 15, 2016

(54) DISPLAY APPARATUS, DRIVING METHOD FOR DISPLAY APPARATUS AND ELECTRONIC APPARATUS

(75) Inventors: Tetsuro Yamamoto, Kanagawa (JP); Katsuhide Uchino, Kanagawa (JP)

(73) Assignee: JOLED Inc., Tokyo (JP)

( * ) Notice: Subject to any disclaimer, the term of this patent is extended or adjusted under 35 U.S.C. 154(b) by 1274 days.

(21) Appl. No.: 12/285,753

(22) Filed: Oct. 14, 2008

(65) Prior Publication Data

US 2009/0122053 A1 May 14, 2009

(30) Foreign Application Priority Data

Nov. 14, 2007 (JP) ................................ 2007-295553

(51) Int. Cl.
*G06F 3/038* (2013.01)
*G09G 3/32* (2006.01)

(52) U.S. Cl.
CPC ...... *G09G 3/3233* (2013.01); *G09G 2300/0819* (2013.01); *G09G 2300/0842* (2013.01); *G09G 2300/0866* (2013.01); *G09G 2310/0205* (2013.01); *G09G 2310/0218* (2013.01); *G09G 2310/0251* (2013.01); *G09G 2320/043* (2013.01)

(58) Field of Classification Search
USPC ........................................................ 345/213
See application file for complete search history.

(56) References Cited

U.S. PATENT DOCUMENTS

| | | | | |
|---|---|---|---|---|
| 6,067,064 | A * | 5/2000 | Furuhashi et al. | 345/89 |
| 2004/0174349 | A1 | 9/2004 | Libsch et al. | |
| 2004/0263057 | A1 | 12/2004 | Uchino et al. | |
| 2005/0104818 | A1* | 5/2005 | Kwak et al. | 345/76 |
| 2006/0097966 | A1* | 5/2006 | Choi | 345/77 |
| 2006/0125740 | A1* | 6/2006 | Shirasaki et al. | 345/77 |
| 2006/0208975 | A1* | 9/2006 | Ono | 345/76 |
| 2007/0109232 | A1 | 5/2007 | Yamamoto et al. | |
| 2007/0115225 | A1* | 5/2007 | Uchino et al. | 345/76 |
| 2008/0211797 | A1* | 9/2008 | Lee et al. | 345/205 |
| 2011/0128276 | A1* | 6/2011 | Toyomura et al. | 345/212 |
| 2011/0181626 | A1* | 7/2011 | Toyomura et al. | 345/690 |

FOREIGN PATENT DOCUMENTS

| | | | |
|---|---|---|---|
| EP | 1-785-979 | A2 | 5/2007 |
| JP | 2003-255856 | A | 9/2003 |
| JP | 2003-271095 | A | 9/2003 |
| JP | 2004-029791 | A | 1/2004 |
| JP | 2004-093682 | A | 3/2004 |
| JP | 2004-133240 | A | 4/2004 |
| JP | 2006-313368 | A | 11/2006 |

(Continued)

OTHER PUBLICATIONS

European Search Report issued Dec. 10, 2009 for corresponding European Application No. 08 25 3599.
Singapore Search and Examination Report completed by the Australian Government for corresponding Singapore Application No. 200808267-9 and issued May 12, 2009.
Japanese Office Action issued Mar. 6, 2012 for corresponding Japanese Application No. 2007-295553.

(Continued)

*Primary Examiner* — Kathy Wang-Hurst
*Assistant Examiner* — Peijie Shen
(74) *Attorney, Agent, or Firm* — Michael Best & Friedrich LLP

(57) ABSTRACT

A plurality of scanning periods are combined to form a composite period (2H). Within the first period of the front half, threshold value (Vth) correction is carried out all at once, and within the second period of the latter half, signal (Vsig) writing operation is carried out. High speed writing can be carried out even where the scanning period is shortened.

13 Claims, 22 Drawing Sheets

(56) References Cited

FOREIGN PATENT DOCUMENTS

| | | | |
|---|---|---|---|
| JP | 2007-148128 | A | 6/2007 |
| JP | 2007-148129 | A | 6/2007 |
| KR | 2007-0024534 | A | 3/2007 |
| WO | WO-2006/137659 | A1 | 12/2006 |

OTHER PUBLICATIONS

Japanese Office Action issue Oct. 16, 2012 for corresponding Japanese Application No. 2007-295553.

Korean Office Action issued Aug. 29, 2014 for corresponding Korean Application No. 2008-0109700.

* cited by examiner (1)

(2), (3)

(5a)

(6)

(7)

DISPLAY APPARATUS, DRIVING METHOD FOR DISPLAY APPARATUS AND ELECTRONIC APPARATUS

CROSS REFERENCES TO RELATED APPLICATIONS

The present invention contains subject matter related to Japanese Patent Application JP 2007-295553, filed in the Japan Patent Office on Nov. 14, 2007, the entire contents of which being incorporated herein by reference.

BACKGROUND OF THE INVENTION

1. Field of the Invention

This invention relates to a display apparatus of the active matrix type wherein a light emitting element is used in a pixel and a driving method for a display apparatus of the type described. The present invention relates also to an electronic apparatus which includes a display apparatus of the type described.

2. Description of the Related Art

In recent years, development of a display apparatus of the planar self-luminous type which uses an organic EL (electroluminescence) device as a light emitting element is proceeding energetically. The organic EL device utilizes a phenomenon that, if an electric field is applied to an organic thin film, then the organic thin film emits light. Since the organic EL device is driven by an application voltage lower than 10V, the power consumption of the same is low. Further, since the organic EL device is a self-luminous device which itself emits light, it requires no illuminating member and can be formed as a device of a reduced weight and a reduced thickness. Further, since the response speed of the organic EL device is approximately several μs and very high, an after-image upon display of a dynamic picture does not appear.

Among display apparatus of the flat self-luminous type wherein an organic EL device is used in a pixel, a display apparatus of the active matrix type wherein thin film transistors as active elements are formed in an integrated relationship in pixels is being developed energetically. A flat self-luminous display apparatus of the active matrix type is disclosed, for example, in Japanese Patent Laid-Open Nos. 2003-255856 (hereinafter referred to as Patent Document 1), 2003-271095 (hereinafter referred to as Patent Document 2), 2004-133240 (hereinafter referred to as Patent Document 3), 2004-029791 (hereinafter referred to as Patent Document 4) and 2004-093682 (hereinafter referred to as Patent Document 5).

FIG. 23 schematically shows an example of an existing active matrix display apparatus. Referring to FIG. 23, the display apparatus shown includes a pixel array section 1 and peripheral driving sections. The driving sections include a horizontal selector 3 and a write scanner 4. The pixel array section 1 includes a plurality of signal lines SL extending along the direction of a column and a plurality of scanning lines WS extending along the direction of a row. A pixel 2 is disposed at a place at which each of the signal lines SL and each of the scanning lines WS intersect with each other. In order to facilitate understandings, only one pixel 2 is shown in FIG. 23. The write scanner 4 includes a shift register which operates in response to a clock signal ck supplied thereto from the outside to successively transfer a start pulse sp supplied thereto similarly from the outside to output a sequential control signal to the scanning line WS. The horizontal selector 3 supplies an image signal to the signal line SL in synchronism with the line sequential scanning of the write scanner 4 side.

The pixel 2 includes a sampling transistor T1, a driving transistor T2, a storage capacitor C1 and a light emitting element EL (electroluminescence). The driving transistor T2 is of the P-channel type, and is connected at the source thereof, which is one of current terminals, to a power supply line and at the drain thereof, which is the other current terminal, to the light emitting element EL. The driving transistor T2 is connected at the gate thereof, which is a control terminal thereof, to the signal line SL through the sampling transistor T1. The sampling transistor T1 is rendered conducting in response to a control signal supplied thereto from the write scanner 4 and samples and writes an image signal supplied from the signal line SL into the storage capacitor C1. The driving transistor T2 receives, at the gate thereof, the image signal written in the storage capacitor C1 as a gate voltage Vgs and supplies drain current Ids to the light emitting element EL. Consequently, the light emitting element EL emits light with luminance corresponding to the image signal. The gate voltage Vgs represents a potential at the gate with reference to the source.

The driving transistor T2 operates in a saturation region, and the relationship between the gate voltage Vgs and the drain current Ids is represented by the following characteristic expression:

$$Ids=(1/2)\mu(W/L)\mathrm{Cox}(Vgs-Vth)^2$$

where μ is the mobility of the driving transistor, W the channel width of the driving transistor, L the channel length of the driving transistor, Cox the gate insulating layer capacitance per unit area of the driving transistor, and Vth is the threshold voltage of the driving transistor. As can be apparently seen from the characteristic expression, when the driving transistor T2 operates in a saturation region, it functions as a constant current source which supplies the drain current Ids in response to the gate voltage Vgs.

FIG. 24 illustrates a voltage/current characteristic of the light emitting element EL. In FIG. 24, the axis of abscissa indicates the anode voltage V and the axis of ordinate indicates the drain current Ids. It is to be noted that the anode voltage of the light emitting element EL is the drain voltage of the driving transistor T2. The current/voltage characteristic of the light emitting element EL varies with time such that the characteristic curve thereof tends to become less steep as time passes. Therefore, even if the drain current Ids is fixed, the anode voltage or drain voltage V varies. In this regard, since the driving transistor T2 in the pixel 2 shown in FIG. 23 operates in a saturation region and can supply drain current Ids corresponding to the gate voltage Vgs irrespective of the variation of the drain voltage, the emission light luminance can be kept fixed irrespective of the time variation of the characteristic of the light emitting element EL.

FIG. 25 shows another example of an existing pixel circuit. Referring to FIG. 25, the pixel circuit shown is different from that described hereinabove with reference to FIG. 23 in that the driving transistor T2 is not of the P-channel type but of the N-channel type. From a fabrication process of a circuit, it is frequently advantageous to form all transistors which compose a pixel from N-channel transistors.

SUMMARY OF THE INVENTION

However, in the circuit configuration of FIG. 25, since the driving transistor T2 is of the N-channel type, it is connected at the drain thereof to a power supply line and at the source S thereof to the anode of the light emitting element EL. Accordingly, when the characteristic of the light emitting element EL varies with time, since an influence appears with the potential of the source S of the driving transistor T2, the gate voltage Vgs varies and the drain current Ids supplied by the driving transistor T2 varies as time passes. Therefore, the luminance of the light emitting element EL varies as time passes. Further, not only the luminance of the light emitting element EL but also the threshold voltage Vth of the driving transistor T2 disperses for each pixel. Since the threshold voltage Vth is included in the transistor characteristic expression given hereinabove, even if the gate voltage Vgs is fixed, the drain current Ids varies. Consequently, the emission light luminance disperses for each pixel, and uniformity of the screen image cannot be obtained. A display apparatus having a function of correcting the threshold voltage Vth of the driving transistor T2 which disperses for each pixel, that is, a threshold voltage correction function, has been proposed heretofore and is disclosed, for example, in Patent Document 3 mentioned hereinabove.

The display apparatus of the active matrix type successively scans the scanning lines for each one horizontal period (1H) to sample and write the signal potential of an image signal into the storage capacitor. In particular, the display apparatus of the active matrix type carries out a signal potential writing operation by line-sequential scanning for 1H period. An existing display apparatus having the threshold voltage correction function carries out a threshold value correction operation in synchronism with the line sequential scanning. Accordingly, it is necessary for the existing display apparatus to carry out a threshold voltage correction operation and a signal potential writing operation within 1H period for pixels for one line (one row).

However, as enhancement of the definition and increase of the density or higher speed driving of a display apparatus progress, the 1H period is compressed and becomes shorter in time. Accordingly, it is becoming difficult to complete a threshold voltage correction operation and a signal potential writing operation within such a shortened 1H period, which is a subject to be solved.

Therefore, it is desirable to provide a display apparatus which can execute a threshold voltage correction operation and a signal potential writing operation stably at a high speed even where 1H period becomes shorter.

According to an embodiment of the present invention, there is provided a display apparatus includes a pixel array section, and a driving section, the pixel array section including a plurality of scanning lines extending along the direction of a row, a plurality of signal lines extending along the direction of a column, and a plurality of pixels disposed in rows and columns at places at which the scanning lines and the signal lines intersect with each other, each of the pixels including a sampling transistor, a driving transistor, a storage capacitor and a light emitting element, the sampling transistor being connected at a control terminal thereof to an associated one of the scanning lines and at a pair of current terminals thereof to a first one of the signal lines and a control terminal of the driving transistor, the driving transistor being connected at a first one of a pair of current terminals thereof to the light emitting element and at a second one of the current terminals thereof to a power supply, the storage capacitor being connected between the control terminal and one of the current terminals of the driving transistor, the driving section including a write scanner for supplying control signals to the scanning lines and a for switchably supplying a signal potential and a reference potential to the signal lines, the sampling transistor carrying out a threshold voltage correction operation in response to a control signal supplied to the associated scanning line when the associated signal line has the reference potential to write a voltage corresponding to a threshold voltage of the driving transistor into the storage capacitor and then a signal potential writing operation in response to a control signal supplied to the associated scanning line when the associated signal line has the signal potential to sample an image signal from the associated signal line and write the sampled image signal to the storage capacitor, the driving transistor supplying current in response to the signal potential written in the storage capacitor to the light emitting element to cause the light emitting element to emit light, the write scanner combining scanning periods allocated individually to plural ones of the scanning lines to form a composite scanning period including a first period and a second period, the write scanner outputting control signals to the scanning lines all at once within the first period to execute the threshold value correction operation of the scanning lines all at once, the write scanner outputting sequential control signals to the scanning lines within the second period to execute a sequential signal potential writing operation.

Preferably, the write scanner is composed of two or more gate drivers connected in series and each allocated to a predetermined number of ones of the scanning lines to form the composite scanning period.

Preferably, the write scanner outputs the sequential control signals with a phase difference smaller than one scanning period to the scanning lines within the second period.

Preferably, the pixel array section further includes feed lines disposed in parallel to the scanning lines for supplying power to the second current terminals of the driving transistors while the driving section includes a power supply scanner for supplying a power supply voltage, which changes over between a high potential and a low potential, to the feed lines, and the power supply scanner supplies the low potential to the feed lines corresponding to the scanning lines to execute the threshold voltage correction operation within the first period and then switchably supplies the high potential all at once to the feed lines.

In this instance, preferably the power supply scanner supplies the low potential with a phase difference smaller than one scanning period sequentially to the feed lines within the first period and then switchably supplies the high potential all at once to the feed lines.

In the display apparatus, pluralities of scanning periods (horizontal periods) are combined to form a composite scanning period including a first period and a second period. Within the first period which is the front half the composite scanning period, control signals are outputted from the write scanner to the scanning lines to carry out a threshold voltage correction operation all at once. Then, within the second period which is the rear half of the composite scanning period, sequential control signals are outputted from the write scanner to the scanning lines to carry out a sequential signal potential writing operation. In this manner, in the display apparatus, a plurality of scanning periods (horizontal periods) are combined and the threshold voltage correction operation is carried out commonly within the front half of the composite period, whereafter the signal writing operation is carried out sequentially. Consequently, even if the horizontal period H is shortened, since the threshold voltage correction operation and the signal potential writing operation can be carried out normally and stably within the shortened horizontal period, the display apparatus can be ready for enhancement of the definition and increase of the driving speed of pixels of a display apparatus of the active matrix type. Further, with the display apparatus, since the threshold voltage correction period can be taken substantially long, the threshold voltage correction operation can be carried out with certainty, and uniform picture quality free from unevenness can be achieved.

DETAILED DESCRIPTION OF THE PREFERRED EMBODIMENT

Figure 1:
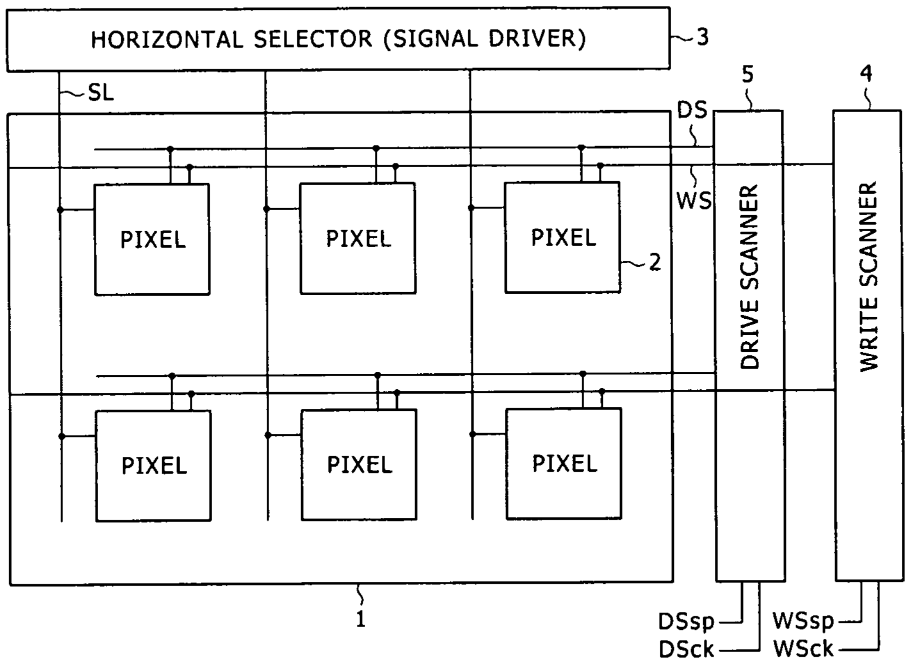
FIG. 1 is a block diagram showing a general configuration of a display apparatus according to the present invention.

The preferred embodiment of the present invention will now be described in reference to the accompanying drawings. In the FIG. 1, there is shown a general configuration of a display apparatus according to the present invention. The display apparatus shown includes a pixel array section 1, and driving sections (3, 4 and 5) for driving the pixel array section 1. The pixel array section 1 includes a plurality of scanning lines WS extending along the direction of a row, a plurality of signal lines SL extending along the direction of a column, a plurality of pixels 2 disposed in rows and columns at places at which the scanning lines WS and the signal lines SL intersect with each other, and a plurality of feed lines DS serving as power supply lines disposed corresponding to the rows of the pixels 2. The driving sections 3, 4 and 5 include a controlling scanner (write scanner) 4 for successively supplying a control signal to the scanning lines WS to line-sequentially scan the pixels 2 in a unit of a row, a power supply scanner (drive scanner) 5 for supplying a power supply potential which is changed over between a first potential and a second potential to each of the feed lines DS in response to the line-sequential scanning, and a signal driver (horizontal selector) 3 for supplying a signal potential serving as an image signal and a reference potential to the signal lines SL in the columns in response to the line-sequential scanning. It is to be noted that the controlling scanner or write scanner 4 operates in response to a clock signal WSck supplied thereto from the outside to successively transfer a start pulse WSsp supplied similarly from the outside to output a control signal to the scanning lines WS. The power supply scanner or drive scanner 5 operates in response to a clock signal DSck supplied from the outside to successively transfer a start pulse DSsp supplied similarly from the outside to line-sequentially change over the potential of the feed lines DS.

Figure 2:
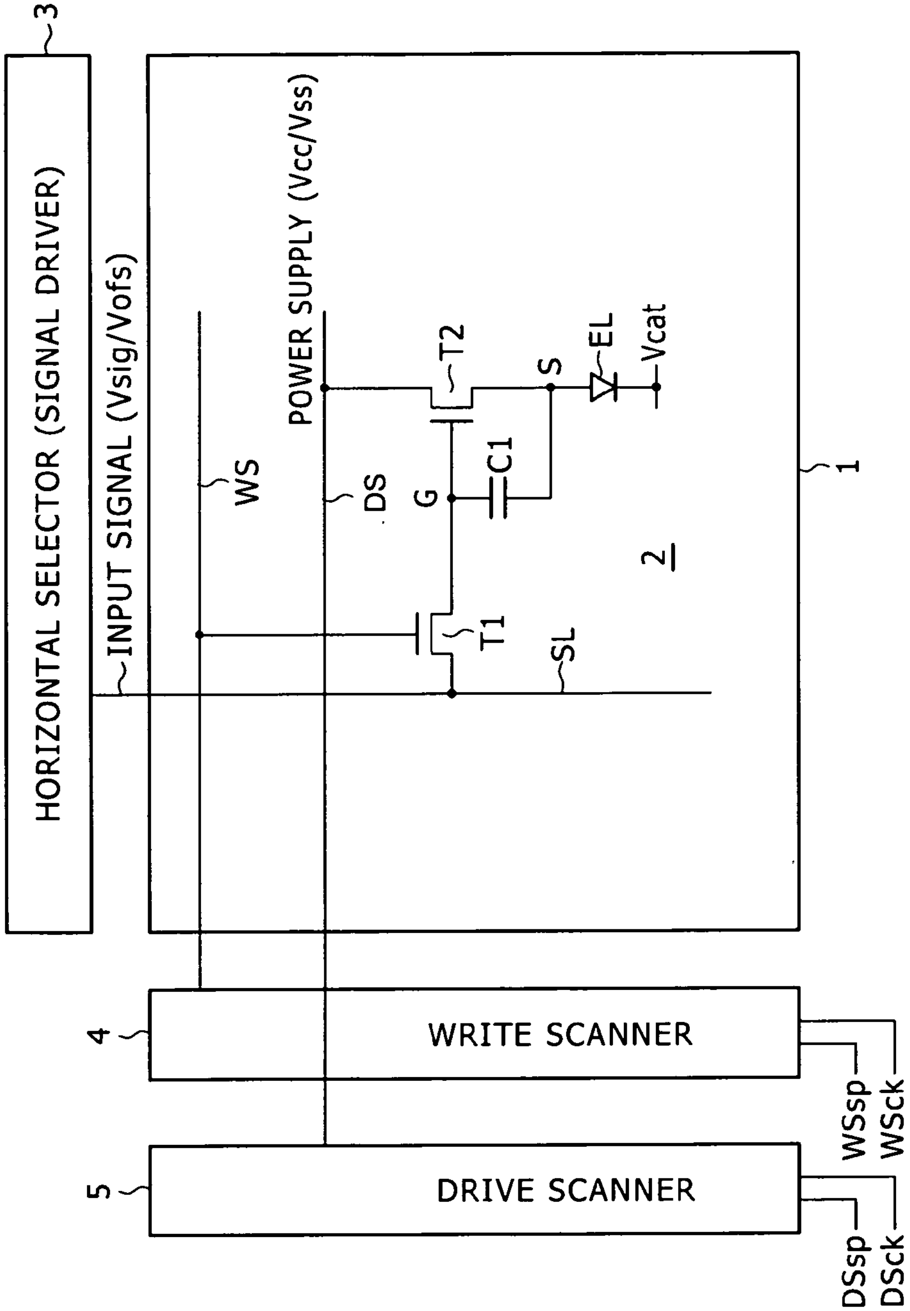
FIG. 2 is a circuit diagram showing an example of a pixel formed in the display apparatus shown in FIG. 1.

FIG. 2 shows a particular configuration of the pixels 2 included in the display apparatus shown in FIG. 1. Referring to FIG. 2, each pixel 2 includes a light emitting element EL of the two-terminal type or diode type represented by an organic EL device, a sampling transistor T1 of the N-channel type, a driving transistor T2 of the N-channel type, and a storage capacitor C1 of the thin film type. The sampling transistor T1 is connected at the gate thereof, which serves as a control terminal, to a scanning line WS, at one of the source and the drain thereof, which serve as current terminals, to the gate G of the driving transistor T2, and at the other one of the source and the drain thereof to a signal line SL. The driving transistor T2 is connected at one of the source and the drain thereof to the light emitting element EL and at the other one of the source and the drain thereof to a feed line DS. In the present embodiment, the driving transistor T2 is of the N-channel type and is connected at the drain side thereof, which is one of the current terminals, to the feed line DS and at the source S side thereof, which is the other current terminal, to the anode side of the light emitting element EL. The light emitting element EL is connected at the cathode thereof and fixed to a predetermined cathode potential Vcat. The storage capacitor C1 is connected between the source S as the current terminal and the gate G as the control terminal of the driving transistor T2. The controlling scanner or write scanner 4 changes over the potential to the scanning line WS between the low potential and the high potential to output a sequential control signal to the pixels 2 having such a configuration as described above thereby to line-sequentially scan the pixels 2 in a unit of a row. The power supply scanner or driver scanner 5 supplies a power supply potential, which changes over between a first potential Vcc and a second potential Vss to the feed lines DS in response to the line-sequential scanning. The signal driver or horizontal selector 3 supplies a signal potential Vsig, which is an image signal, and a reference potential Vofs to the signal lines SL extending in the column direction in synchronism with the line-sequential scanning.

In the display apparatus having the configuration described above, the sampling transistor T1 samples and writes the signal potential Vsig into the storage capacitor C1 within a sampling period from a second timing at which the control signal rises after a first timing at which the image signal rises from the reference potential Vofs to the signal potential Vsig to a third timing at which the control signal falls to turn off the sampling transistor T1. Simultaneously, the current flowing through the driving transistor T2 is negatively fed back to the storage capacitor C1 to apply correction of the mobility μ of the driving transistor T2 to the signal potential written in the storage capacitor C1. In other words, the sampling period from the second timing to the third timing serves also as a mobility correction period within which the current flowing through the driving transistor T2 is negatively fed back to the storage capacitor C1.

The pixel circuit shown in FIG. 2 includes a threshold voltage correction function in addition to the mobility correction function described above. In particular, the power supply scanner or driver scanner 5 changes over the potential to the feed line DS from the first potential Vcc to the second potential Vss at the first timing before the sampling transistor T1 samples the signal potential Vsig. Similarly, at the second timing before the sampling transistor T1 samples the signal potential Vsig, the controlling scanner or write scanner 4 renders the sampling transistor T1 conducting to apply the reference potential Vofs from the signal line SL to the gate G of the driving transistor T2 to set the source S of the driving transistor T2 to the second potential Vss and set the source S of the driving transistor T2 to the second potential Vss. At the third timing after the second timing, the power supply scanner or drive scanner 5 changes over the feed line DS from the second potential Vss to the first potential Vcc to store a voltage corresponding to the threshold voltage Vth of the driving transistor T2 into the storage capacitor C1. By such threshold voltage correction function as just described, the present display apparatus can cancel the influence of the threshold voltage Vth of the driving transistor T2 which disperses for each pixel. It is to be noted that the order in time of the first timing and the second timing may be reversed.

The pixels 2 shown in FIG. 2 further includes a bootstrap function. In particular, the controlling scanner or write scanner 4 places the sampling transistor T1 into a non-conducting state to electrically disconnect the gate G of the driving transistor T2 from the signal line SL at a point of time at which the signal potential Vsig is stored into the storage capacitor C1. Consequently, the gate potential of the driving transistor T2 varies in an interlocking relationship with the variation of the source potential of the driving transistor T2 to keep the gate-source voltage Vgs between the gate G and the source S of the driving transistor T2 fixed. Even if the current/voltage characteristic of the light emitting element EL varies as time passes, the gate-source voltage Vgs can be kept fixed, and no variation of the luminance occurs.

Figure 3:
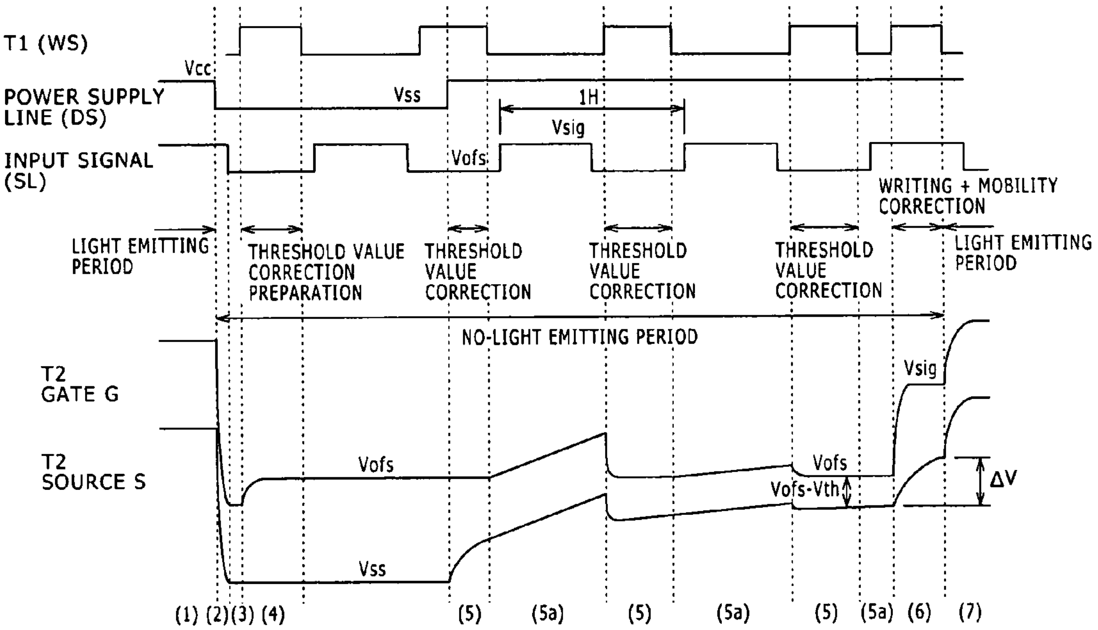
FIG. 3 is a timing chart illustrating a reference example of operation of the pixel shown in FIG. 2.

FIG. 3 illustrate operation of the pixel shown in FIG. 2. It is to be noted that the operation illustrated in FIG. 3 is a reference example, and the operation of the pixel circuit shown in FIG. 2 is not limited to that illustrated in FIG. 3. The timing chart of FIG. 3 illustrates the potential variation of the scanning line WS, the potential variation of the feed line or power supply line DS and the potential variation of the signal line SL with respect to the common time axis. The potential variation of the scanning line WS represents the control signal and controls the sampling transistor T1 between open and closed state. The potential variation of the feed line DS represents changeover between the power supply voltages Vcc and Vss. The potential variation of the signal line SL represents changeover between the signal potential Vsig and the reference potential Vofs of the input signal. In parallel to the potential variations mentioned, also the potential variations of the gate G and the source S of the driving transistor T2 are illustrated. The potential difference Vgs is the potential difference between the gate G and the source S as described hereinabove.

The period of the timing chart of FIG. 3 is divided into (1) to (7) periods in accordance with the transition of the operation of the pixel for the convenience of description. Within the period (1) immediately prior to the pertaining field, the light emitting element EL is in a light emitting state. Thereafter, the new field of the line-sequential scanning is entered, and within the first period (2), the potential of the feed line DS is changed over from the first potential Vcc to the second potential Vss. Then, within the next period (3), the input signal is changed over from the signal potential Vsig to the reference potential Vofs. Further, within the period (4), the sampling transistor T1 is turned on. Within the periods (2) to (4), the gate voltage and the source voltage of the driving transistor T2 are initialized. The periods (2) to (4) are a preparation period for threshold voltage correction, within which the gate G of the driving transistor T2 is initialized to the reference potential Vofs and the source S of the driving transistor T2 is initialized to the second potential Vss. Then, within the period (5), a threshold voltage correction operation is carried out actually, and a voltage corresponding to the threshold voltage Vth is stored between the gate G and the source S of the driving transistor T2. Actually, the voltage corresponding to the threshold voltage Vth is written into the storage capacitor C1 connected between the gate G and the source S of the driving transistor T2.

It is to be noted that, in the reference example of FIG. 3, the threshold correction period (5) is provided three times, and a waiting period (5*a*) is inserted next to each of the threshold correction periods (5). By dividing the threshold voltage correction period (5) to repeat the threshold voltage correction operation by a plural number of times, a voltage corresponding to the threshold voltage Vth is written into the storage capacitor C1. It is to be noted, however, that the present invention is not limited to this, but the correction operation may be carried out within one threshold voltage correction period (5).

Thereafter, the writing operation period/mobility correction period (6) is entered. Here, the signal potential Vsig of the image signal is written in an accumulated manner into the storage capacitor C1 while a voltage ΔV for mobility correction is subtracted from the voltage stored in the storage capacitor C1. Within the writing operation period/mobility correction period (6), it is necessary to place the sampling transistor T1 into a conducting state within a time zone within which the signal line SL remains having the signal potential Vsig. Thereafter, the light emitting period (7) is entered, and the light emitting element emits light with a luminance corresponding to the signal potential Vsig. Thereupon, since the signal potential Vsig is adjusted with the voltage corresponding to the threshold voltage Vth and the voltage ΔV for mobility correction, the emission light luminance of the light emitting element EL is not influenced by the dispersion of the threshold voltage Vth or the mobility μ of the driving transistor T2. It is to be noted that a bootstrap operation is carried out at the beginning of the light emitting period (7), and while the gate-source voltage Vgs of the driving transistor T2 is kept fixed, the gate potential and the source potential of the driving transistor T2 rise.

Figure 4:
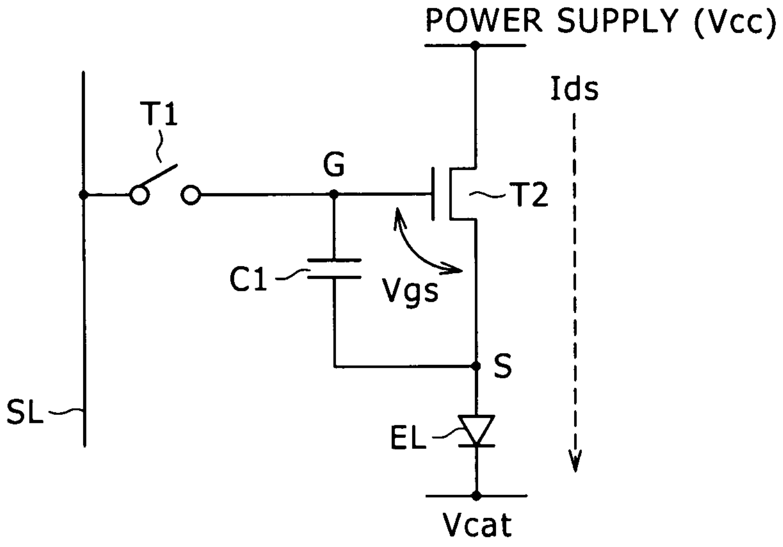
FIGS. 4, 5, 6 and 7 are circuit diagrams illustrating operations of the pixel shown in FIG. 2.

Operation of the pixel circuit shown in FIG. 2 is described in detail with reference to FIGS. 4 to 12. First, within the light emitting period (1), as seen in FIG. 4, the power supply potential is set to the first potential Vcc and the sampling transistor T1 is in an off state. At this times, since the driving transistor T2 is set so as to operate in a saturation region, the driving current Ids flowing through the light emitting element EL assumes a value given by the transistor characteristic expression mentioned hereinabove in response to the gate-source voltage Vgs applied between the gate G and the source S of the driving transistor T2.

Figure 5:
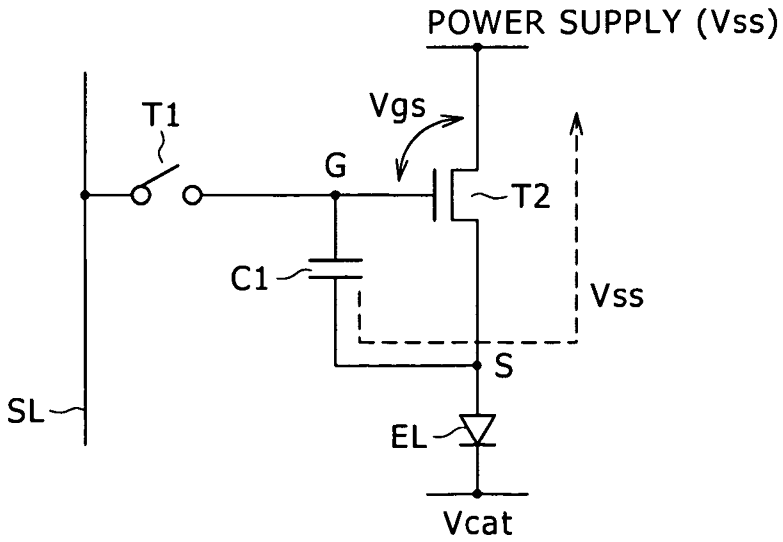
Figure 6:
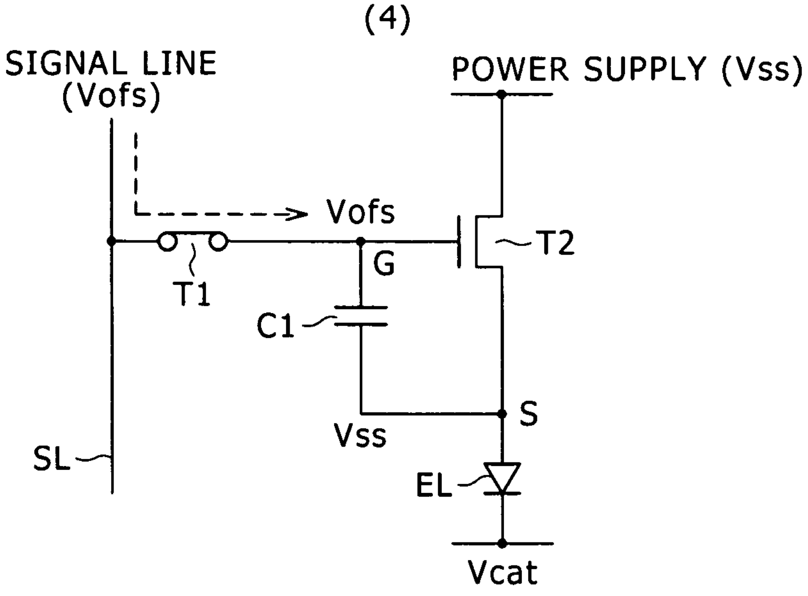

Accordingly, after the preparation period (2) and (3) is entered, the potential of the feed line or power supply line DS is changed to the second potential Vss as seen in FIG. 5. Since the second potential Vss is set such that the driving transistor T2 operates in a saturation region at this time, the light emitting element EL is turned off and the power supply line side becomes the source of the driving transistor T2. At this time, the anode of the light emitting element EL is charged to the second potential Vss.

Figure 7:
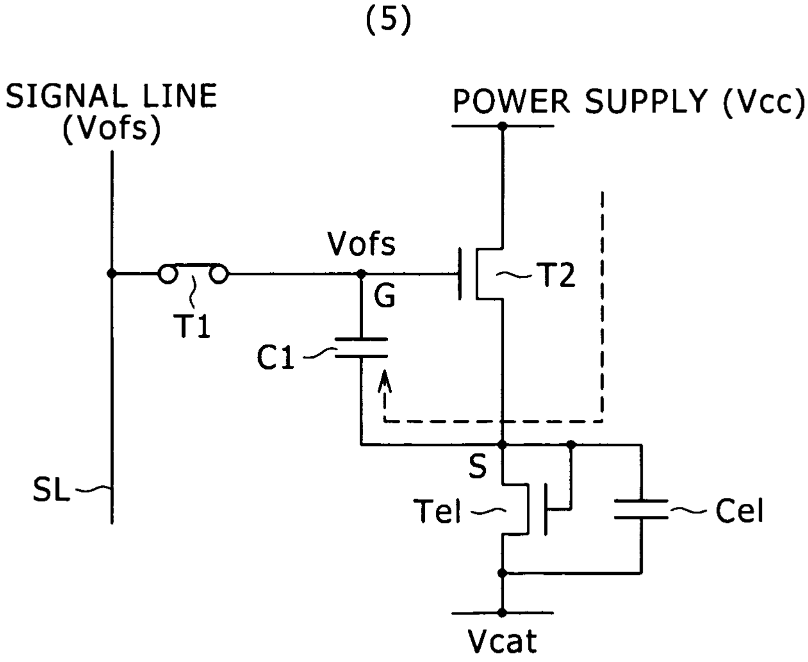

Then, after the next preparation period (4) is entered, while the potential of the signal line SL becomes the reference potential Vofs, the sampling transistor T1 is turned on to set the gate potential of the driving transistor T2 to the reference potential Vofs as seen in FIG. 7. The source S and the gate G of the driving transistor T2 upon light emission are initialized in this manner, and the gate-source voltage Vgs at this time becomes the value of Vofs−Vss. The gate-source voltage Vgs=Vofs−Vss is set so as to have a value higher than the threshold voltage Vth of the driving transistor T2. By initializing the driving transistor T2 such that Vgs>Vth is satisfied in this manner, preparations for a succeeding threshold voltage correction operation are completed.

Then, after the threshold voltage correction period (5) is entered, the potential of the feed line DS returns to the first potential Vcc as seen in FIG. 7. When the power supply voltage becomes the first potential Vcc, the potential of the anode of the light emitting element EL becomes the potential of the source S of the driving transistor T2, and current flows as indicated by a broken line arrow mark in FIG. 7. At this time, the equivalent circuit of the light emitting element EL is represented by a parallel connection of a diode Tel and a capacitor Cel. Since the anode potential of the light emitting element EL, that is, the second potential Vss, is lower than Vcat+Vthel, the diode Tel is in an off state, and leak current flowing through the diode Tel is considerably smaller than the current flowing through the driving transistor T2. Therefore, almost all of the current flowing through the driving transistor T2 is used to charge up the storage capacitor C1 and the equivalent capacitor Cel.

Figure 8:
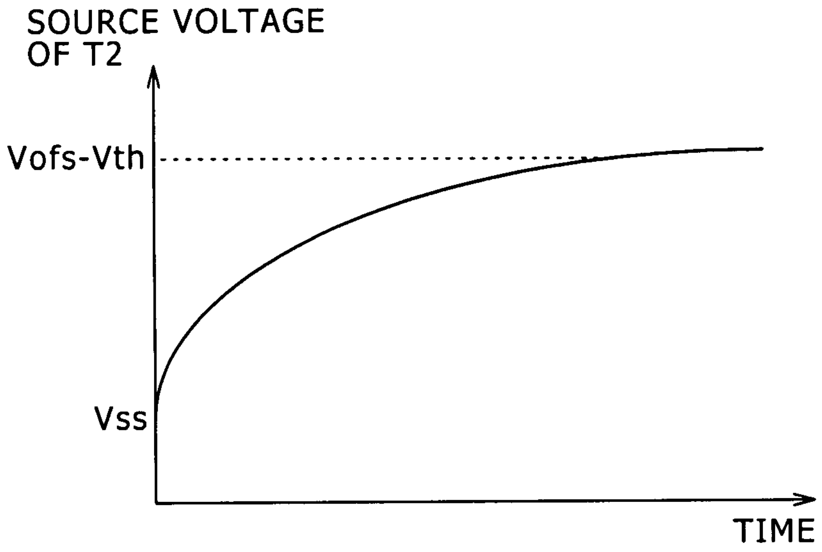
FIG. 8 is a graph illustrating the operation illustrated in FIG. 7.

FIG. 8 illustrates a time variation of the source potential of the driving transistor T2 within the threshold voltage correction period (5) illustrated in FIG. 7. Referring to FIG. 8, the source voltage of the driving transistor T2, that is, the anode voltage of the light emitting element EL, rises from the second potential Vss as time passes. After the threshold voltage correction period (5) passes, the driving transistor T2 is cut off, and the gate-source voltage Vgs between the source S and the gate G of the driving transistor T2 becomes equal to the threshold voltage Vth. At this time, the source potential is given by Vofs−Vth. If this value Vofs−Vth still remains lower than Vcat+Vthel, then the light emitting element EL is in a cutoff state.

Figure 9:
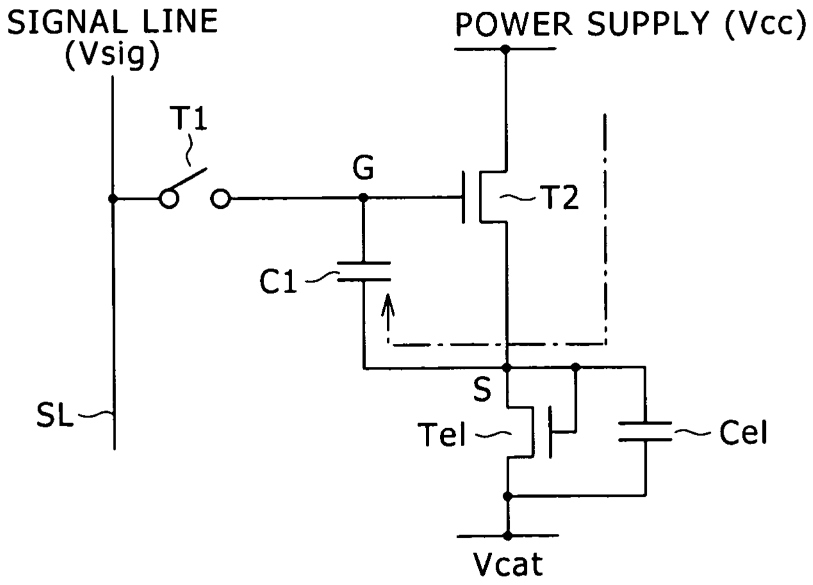
FIGS. 9 and 10 are circuit diagrams illustrating operations of the pixel shown in FIG. 2.

As seen from FIG. 8, the source potential of the driving transistor T2 rises as time passes. However, in the present example, before the source voltage of the driving transistor T2 reaches Vofs−Vth, the first time threshold voltage correction period (5) comes to an end, and therefore, the sampling transistor T1 is turned off and the waiting period (5*a*) is entered. FIG. 9 illustrates a state of the pixel circuit within this waiting period (5*a*). Within this first time waiting period (5*a*), since the gate-source voltage Vgs of the driving transistor T2 still remains higher than the threshold voltage Vth, current flows from the first potential Vcc to the storage capacitor C1 through the driving transistor T2 as seen in FIG. 9. Consequently, although the source voltage of the driving transistor T2 rises, since the sampling transistor T1 is in an off state and the gate G of the driving transistor T2 is in a high impedance state, also the potential of the gate G of the driving transistor T2 rises together with the potential rise of the source S. In other words, within the first-time waiting period (5*a*), both of the source potential and the gate potential of the driving transistor T2 rise. At this time, since the reverse bias continues to be applied to the light emitting element EL, the light emitting element EL emits no light.

Thereafter, when the time of 1H passes and the potential of the signal line SL becomes the reference potential Vofs, the sampling transistor T1 is turned on to start the second time threshold voltage correction operation. Thereafter, when the second time threshold voltage correction period (5) elapses, the second time waiting period (5*a*) is entered. By repeating the threshold voltage correction period (5) and the waiting period (5*a*) in this manner, the gate-source voltage Vgs of the driving transistor T2 finally reaches a voltage corresponding to the threshold voltage Vth. At this time, the source potential of the driving transistor T2 is Vofs − Vth and is lower than Vcat+ Vthel.

Figure 10:
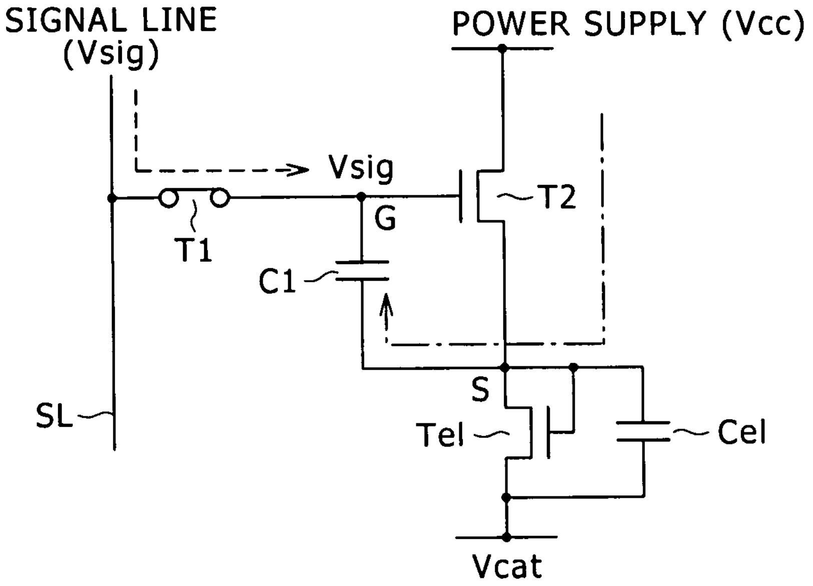

Thereafter, when the writing operation period/mobility correction period (6) is entered, the potential of the signal line SL is changed over from the reference potential Vofs to the signal potential Vsig and then the sampling transistor T1 is turned on as seen in FIG. 10. At this time, the signal potential Vsig has a voltage value according to a gradation. Since the sampling transistor T1 is on, the gate potential of the driving transistor T2 becomes the signal potential Vsig. Meanwhile, the source potential of the driving transistor T2 rises as time passes because current flows therethrough from the first potential Vcc. Also at this time, if the source potential of the driving transistor T2 does not exceed the sum of the threshold voltage Vthel of the light emitting element EL and the cathode potential Vcat, then the current flowing from the driving transistor T2 is used only for charging of the capacitor equivalent Cel and the storage capacitor C1. At this time, since the threshold voltage correction operation of the driving transistor T2 has been completed already, the current supplied from the driving transistor T2 reflects the mobility μ. Particularly, where the driving transistor T2 has a high mobility μ, the current amount at this time is great and also the potential rise amount ΔV of the source is great. On the contrary, where the driving transistor T2 has a low mobility μ, the current amount of the driving transistor T2 is small and the potential rise amount ΔV of the source is small. By such operation, the gate-source voltage Vgs of the driving transistor T2 is compressed by the potential rise amount ΔV reflecting the mobility μ, and at a point of time at which the mobility correction period (6) comes to an end, the gate-source voltage Vgs from which the mobility μ is eliminated completely is obtained.

Figure 11:
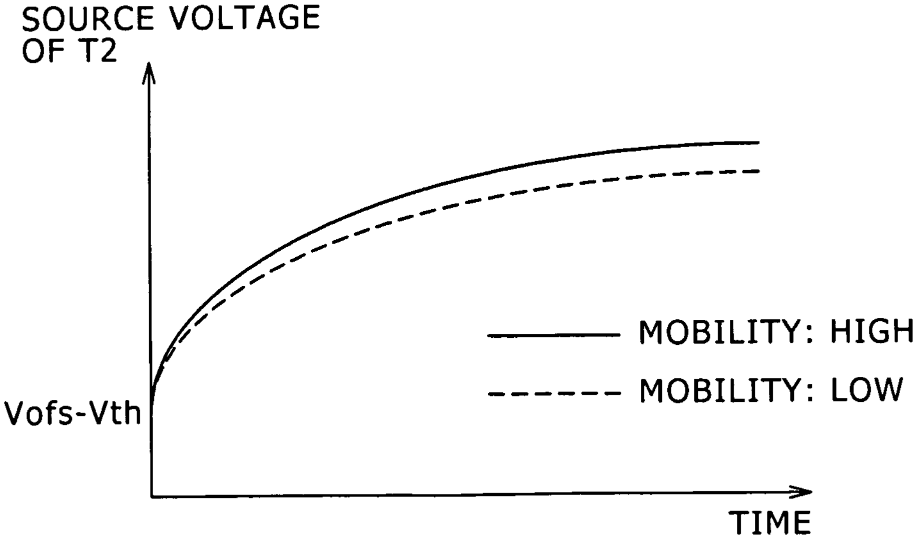
FIG. 11 is a graph illustrating the operation illustrated in FIG. 10.

FIG. 11 illustrates a variation with respect to time of the source potential of the driving transistor T2 within the mobility correction period (6) described above. As seen from FIG. 11, where the mobility of the driving transistor T2 is high, the source voltage of the driving transistor T2 rises quickly and the gate-source voltage Vgs is compressed as much. In other words, where the mobility μ is high, the gate-source voltage Vgs is compressed so as to cancel the influence of the mobility μ, and the driving current can be suppressed. On the other hand, where the mobility μ is low, the source voltage of the driving transistor T2 does not rise very quickly, and also the gate-source voltage Vgs is not compressed very strongly.

Accordingly, where the mobility μ is low, the gate-source voltage Vgs is not compressed very much so as to supplement the low driving capacity.

Figure 12:
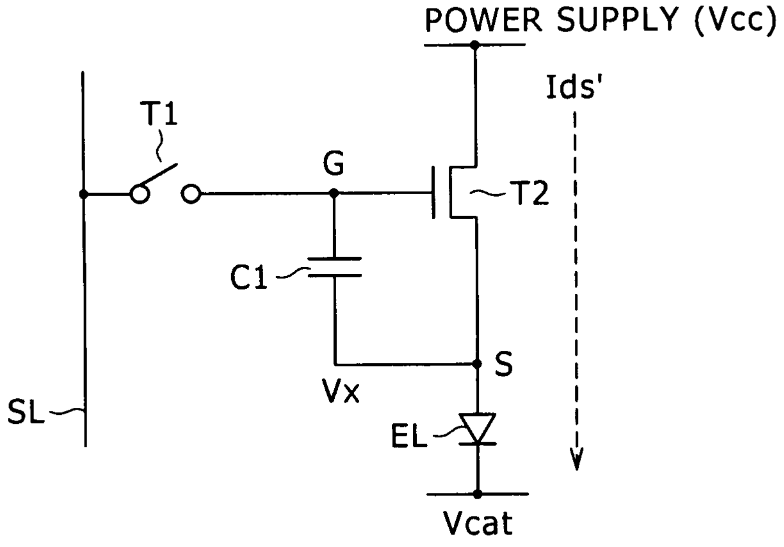
FIG. 12 is a circuit diagram illustrating an operation of the pixel shown in FIG. 2.

FIG. 12 illustrates an operation state within the light emitting period (7). Within the light emitting period (7), the sampling transistor T1 is turned off to cause the light emitting element EL to emit light. The gate-source voltage Vgs of the driving transistor T2 is kept fixed, and the driving transistor T2 supplies fixed driving current Ids in accordance with the characteristic expression given hereinabove to the light emitting element EL. Since driving current Ids' flows through the light emitting element EL, the anode voltage of the light emitting element EL, that is, the source voltage of the driving transistor T2, rises up to Vx, and at a point of time at which the voltage exceeds Vcat+ Vthel, the light emitting element EL emits light. As the light emission time becomes long, the current/voltage of the light emitting element EL varies. As a result, the potential of source S varies as shown in FIG. 11. However, since the gate-source voltage Vgs of the driving transistor T2 is kept at a fixed value by the bootstrap operation, the driving current Ids' flowing through the light emitting element EL does not vary. Therefore, even if the current/voltage characteristic of the light emitting element EL deteriorates, the fixed driving current Ids' require flows, and the luminance of the light emitting element EL does not vary at all.

Figure 13:
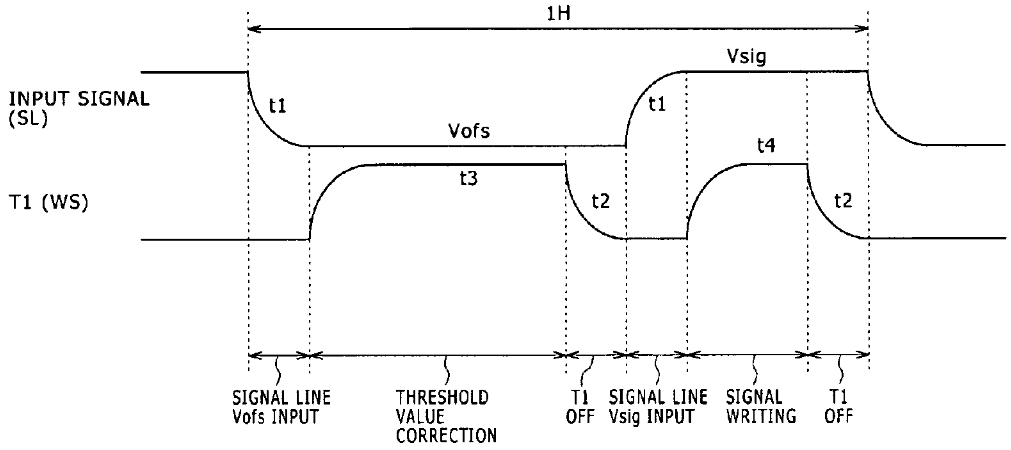
FIG. 13 is a timing chart illustrating operation of the pixel shown in FIG. 2.

FIG. 13 illustrates a detailed threshold value correction operation and a detailed signal writing operation carried out within the last 1H period particularly within the no-light emitting period of the timing chart shown in FIG. 3. Referring to FIG. 13, within the 1H period, the input signal as an image signal changes over between the reference potential Vofs and the signal potential Vsig. In the timing chart of FIG. 13, the transient time of the input signal is represented by t1. The control signal applied to the scanning line WS exhibits the high level only within a time period t3 within the threshold value correction period, and then exhibits the high level within another time period t4 within the signal writing period. In the timing chart, the transient time of the scanning line WS is represented by t2. As can be apparently seen from the timing chart, when the input signal is the reference potential Vofs, the sampling transistor T1 exhibits an on state to carry out the threshold value correction operation, and then when the input signal becomes the signal potential Vsig, the sampling transistor T1 is turned on again to carry out a signal writing operation. Therefore, it is necessary for the display apparatus of the active matrix type to carry out a threshold value correction operation and a signal potential writing operation within 1H period.

Incidentally, as enhancement of the definition and increase of the operation speed of a display apparatus proceed, the 1H period becomes shorter, and also in this instance, in the operation sequence of the reference example described hereinabove with reference to FIG. 3, it is necessary to complete a threshold voltage correction operation and a signal potential writing operation within 1H period. Thereupon, it is necessary to take the transient time periods t1 and t2 of the input signal and the control signal into consideration as seen in the timing chart of FIG. 13 and carry out inputting of the reference potential Vofs to the signal line SL, the threshold voltage correction operation, a turning off operation of the sampling transistor T1, inputting of the signal potential Vsig to the signal line SL, a signal potential writing operation and a turning off operation of the sampling transistor T1 within the period of 1H. In other words, the expression 2t1+2t2+t3+t4<1H must be satisfied. Actually, however, since the period of 1H is shortened considerably as the enhancement of the definition and the increase of the speed of a display apparatus proceed, it is difficult to satisfy the relationship described above and besides complete the threshold value correction operation and the signal potential writing operation within the period of 1H.

Figure 14:
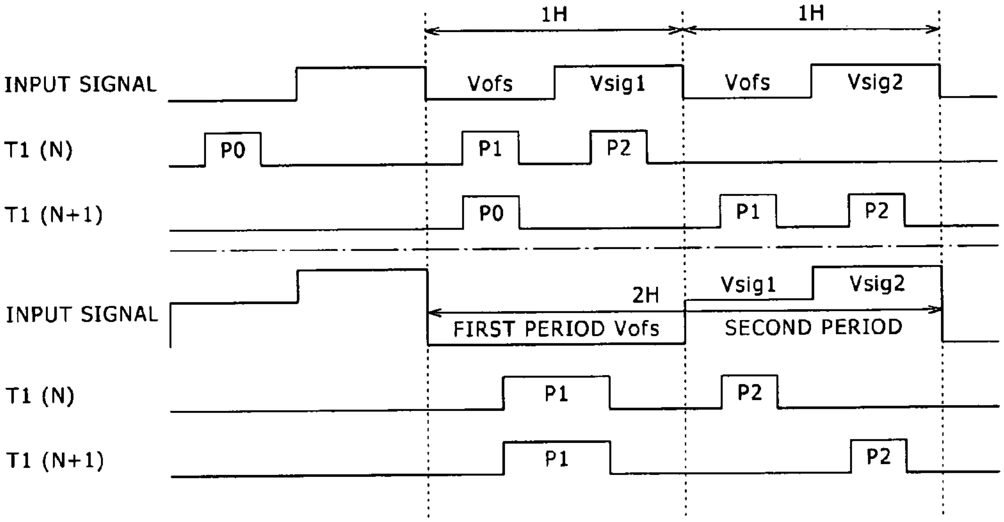
FIG. 14 is a timing chart illustrating operation of the pixel shown in FIG. 2.

In order to cope with the problems of the reference example described above, the present invention combines a plurality of horizontal periods and carries out the threshold value correction operation commonly within part of the combined period. Thereafter, the signal potential writing operation is carried out in order within the remaining part of the combined period. FIG. 14 schematically illustrates an example of an operation sequence where two horizontal periods (2H) are combined. It is to be noted that an operation sequence of the reference example described hereinabove is shown on the upper stage of the timing chart for comparison, and the operation sequence of the present embodiment is illustrated on the lower stage. In the operation sequence of the reference example, the input signal changes over between the reference potential Vofs and the signal potential Vsig in a unit of 1H. To the sampling transistor T1(N) for the Nth line, a control signal including three pulses P0, P1 and P2 is successively applied. The sampling transistor T1(N) turns on in response to the pulses P0, P1 and P2. The control signal shifted rearwardly by 1H and including three pulses P0, P1 and P2 similarly is applied to the sampling transistor T1(N+1) for the N+1th line. Within the first 1H period, when the input signal has the reference potential Vofs, the sampling transistor T1(N) turns on in response to the control pulse P1 to carry out a threshold voltage correction operation. Thereafter, when the input signal changes to a signal potential Vsig1 within the same 1H period, the sampling transistor T1(N) turns on in response to the control pulse P2 to carry out a signal potential writing operation. The sampling transistor T1(N) of the Nth line completes the threshold voltage correction operation and the signal potential writing operation within the first horizontal period in this manner. It is to be noted that, at this time, the sampling transistor T1(N+1) of the next line turns on in response to the control pulse P0 to carry out a first time threshold voltage correction operation.

After the second time horizontal period is entered, when the input signal is the reference potential Vofs, the sampling transistor T1(N+1) of the N+1th line turns on in response to the control pulse P1 to carry out a second time threshold voltage correction operation. Then, when the input signal changes over from the reference potential Vofs to a signal potential Vsig2, the sampling transistor T1(N+1) turns on in response to the control pulse P2 to carry out a signal potential writing operation. In this manner, the sampling transistor for each line completes the threshold voltage correction operation and the signal potential writing operation within a period of 1H. In the present reference example, since the correction is not completed by the first time threshold voltage correction operation, the threshold voltage correction operation is carried out divisionally twice and repetitively.

In contrast, in the operation sequence according to the present embodiment, the write scanner combines a plurality of scanning periods (1H) individually allocated to different scanning lines (in the present embodiment, two scanning lines) to form a composite period of a first period and a second period. In other words, this composite scanning period corresponds to 2H. Within the fist period, the control pulse P1 is outputted at a time to the two scanning lines (Nth line and N+1th line) to carry out a threshold voltage correction operation at a time. Then, within the second period, the control pulse P2 is outputted to the two scanning lines (Nth line and N+1th line) to execute a sequential signal potential writing operation. In the example, the input signal is the reference potential Vofs within the first period which corresponds to the front half of the composite scanning period 2H and changes in order from the signal potential Vsig to the signal potential Vsig2 within the second period of the latter half of the composite scanning period 2H. At this time, the sampling transistor T1(N) of the Nth line turns on in response to the control pulse P2 and samples the signal potential Vsig1. Then, the sampling transistor T1(N+1) of the N+1th line turns on in response to the control pulse P2 and samples the signal potential Vsig2.

Figure 15A:
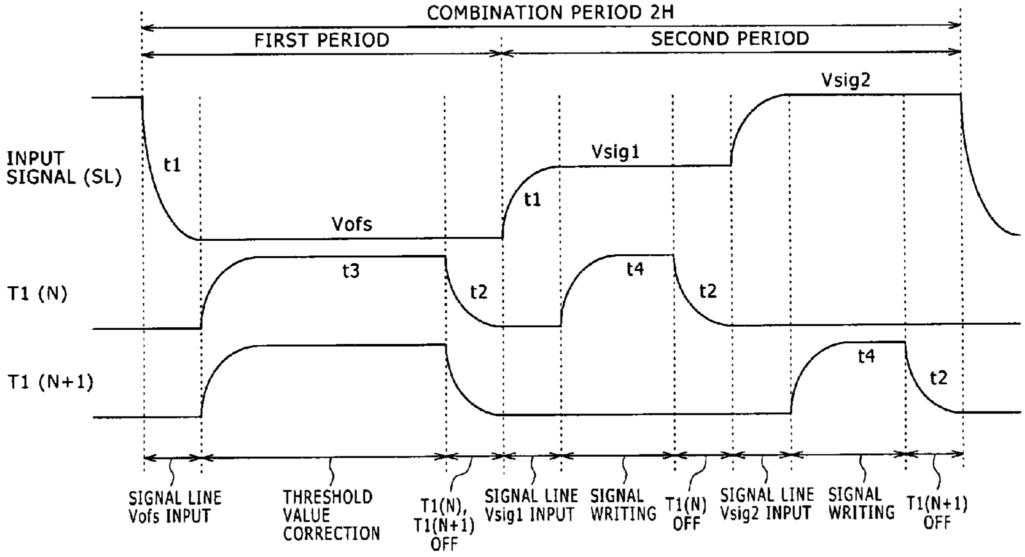
FIG. 15A is a waveform diagram illustrating operation of the display apparatus shown in FIG. 1.

FIG. 15A illustrates details of on/off transient time of the input signal and on/off transient times of the sampling transistors T1(N) and T1(N+1) within the composite scanning period (2H). In order to facilitate understandings, FIG. 15A adopts a representation manner similar to that of the detailed timing chart of the reference example shown in FIG. 13. In the present example, within the front half first period of the composite period 2H, a collective threshold voltage correction operation is carried out, and within the latter half second period, a sequential signal potential writing operation is carried out. Where the transient time of the input signal is represented by t1, the transient time of the sampling transistor T1 by t2, the threshold voltage correction time by t3, and the signal potential writing time by t4, in order to complete the collective threshold voltage correction operation and the sequential signal potential writing operation described above within the period of 2H, it is necessary to satisfy 3t1+3t2+t3+t4<2H. In contrast, it is necessary to satisfy 2t1+2t2+t3+t4<1H with the reference example shown in FIG. 13. Where the two cases are compared with each other, the method of the present invention can complete the entire operation in a shorter period of time by t1+t2+t3 than that with the reference example shown in FIG. 13. Also where the horizontal period H is reduced by the present invention, a predetermined threshold voltage correction operation and a predetermined signal potential writing operation can be carried out, and enhancement of the definition and increase of the operation speed of the panel can be anticipated.

Figure 15B:
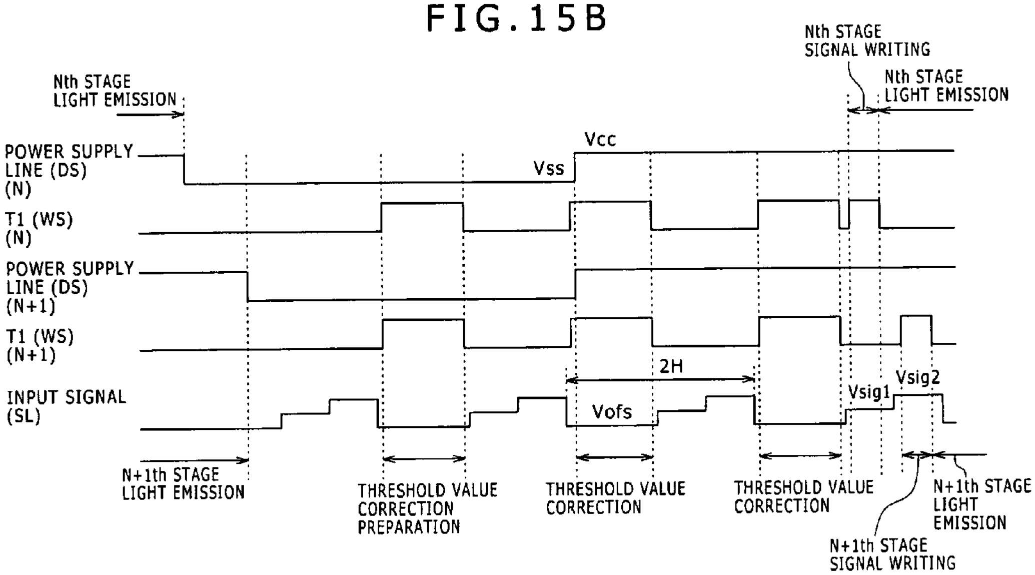
FIG. 15B is a timing chart illustrating a driving method for the display apparatus of FIG. 1.

FIG. 15B illustrates a general configuration of an operation sequence of the display apparatus of the present invention including a potential variation of a power supply line. Referring to FIG. 15B, the waveforms of the control signals applied to the sampling transistors T1(N) and T1(N+1) are common within a correction preparation period and a threshold voltage correction period for the Nth line and the N+1th line. On the other hand, the difference between the signal writing time period for the pixels of the Nth line and the signal writing time period for the pixel of the N+1th line is smaller than 1H. Further, the difference of the time period in which the feed line DS becomes the second potential Vss, that is, a starting timing of a no-light emitting period between the Nth line and the N+1th line is smaller than 1H. After the gate of the driving transistor is set to the reference potential Vofs and the source of the driving transistor is set to the second potential Vss when no light is emitted, the power supply line is changed over from the second potential Vss to the first potential Vcc to carry out a divisional threshold voltage correction operation. Thereafter, while mobility correction is carried out, the signal potentials Vsig1 and Vsig2 are written into the storage capacitors of the respective lines to cause the light emitting elements EL to emit light. In this manner, in the present operation sequence, sequential control signals are outputted to the Nth and N+1th scanning lines WS with a phase difference smaller than one scanning period (1H) within the second period. The power supply scanner supplies the second potential Vss to a plurality of feed lines DS corresponding to the plurality of scanning lines WS (Nth and N+1th scanning lines WS) in order to implement a threshold voltage correction operation within the first period and then changes over the potential to be supplied to the first potential Vcc at a time. Thereupon, within the first period, the power supply scanner supplies the second potential Vss to the plurality of feed lines DS (Nth and N+1th feed lines DS) with a phase difference smaller than one scanning period (1H) within the first period and then changes over the potential to be supplied to the first potential Vcc.

Figure 15C:
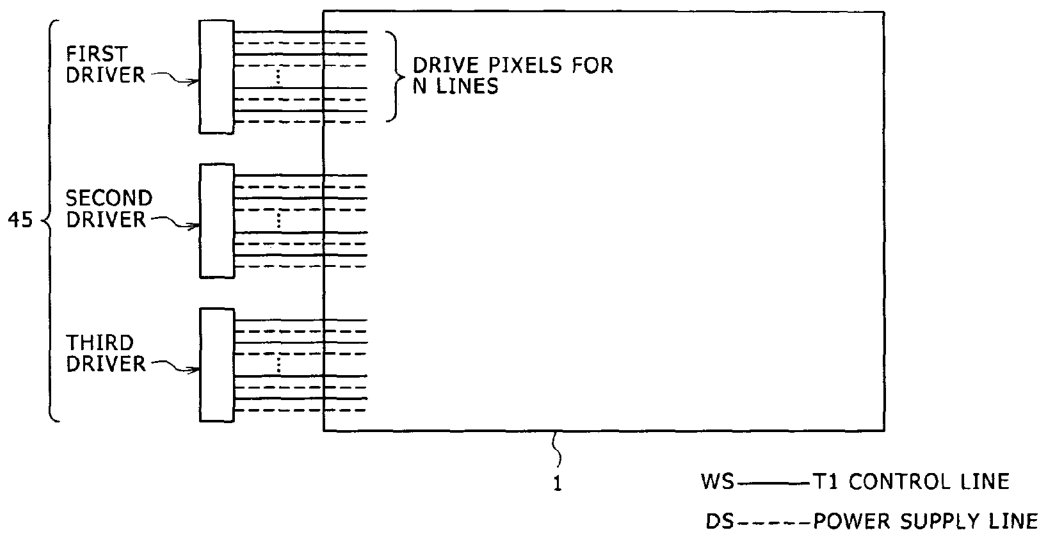
FIG. 15C is a block diagram showing a developed form of the display apparatus of FIG. 1.

FIG. 15C is a developed form of the display apparatus according to the present invention. Referring to FIG. 15C, in the display apparatus shown, the pixel array section 1 is driven by a scanner 45. The scanner 45 is composed of the controlling scanner or write scanner 4 and the power supply scanner or drive scanner 5 shown in FIG. 1 and has a function of scanning both of a control line or scanning line WS and a power supply line or feed line DS for the sampling transistor T1. This integrated scanner 45 is formed from two or more gate drivers connected in series, and a predetermined number of, that is, N, scanning lines WS are collected to produce a combination period for each gate driver.

Figure 15D:
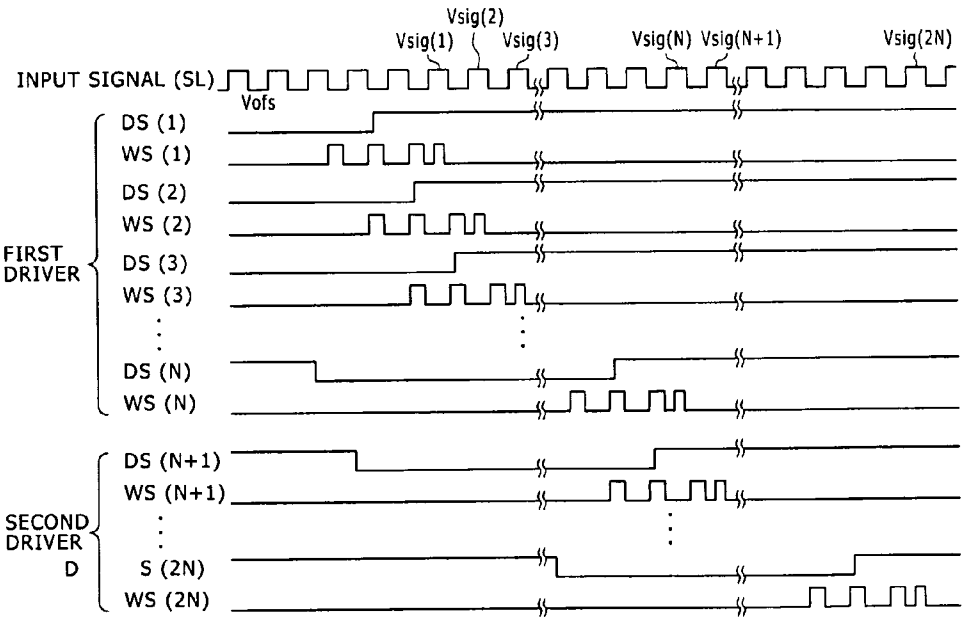
FIGS. 15D and 15E are reference timing charts illustrating operation of a scanner included in the display apparatus shown in FIG. 15C.

FIG. 15D illustrates operation of the integrated scanner 45. It is to be noted that this timing chart of FIG. 15D illustrates an example of a reference, and the scanning lines WS and the feed lines DS are driven line-sequentially. For example, the first driver which is at the top of the gate drivers connected in series sequentially drives N first to Nth scanning lines WS and feed lines DS. The next second driver sequentially drives the N+1th to 2Nth N scanning lines WS and feed lines DS.

Figure 15E:
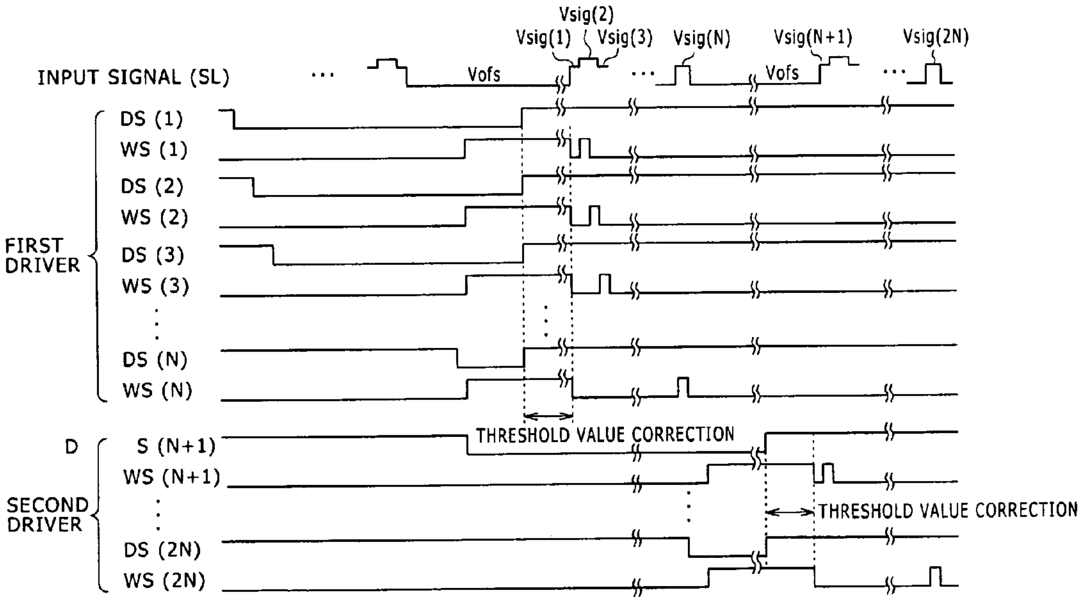

FIG. 15E illustrates operation of the integrated scanner 45 shown in FIG. 15C. In order to facilitate understandings, the timing chart of FIG. 15A adopts a representation manner similar to that of the detailed timing chart of the embodiment shown in FIG. 15B. This integrated scanner 45 is formed from two or more gate drivers connected in series, and a predetermined number N of scanning lines WS are collected to form a composite period for each gate driver. For example, the first driver at the top of the gate drivers connected in series applies a common control signal waveform to the sampling transistors T1(1) to T1(N) within a correction preparation period and a threshold value correction period in the first to Nth lines. Meanwhile, the difference between the signal writing time periods into pixels of adjacent lines is smaller than 1H. Further, also the difference of the timing at which the potential of the power supply line DS becomes the second potential Vss, that is, the starting timing of a no-light emitting period, between adjacent lines is smaller than 1H. After the potential of the gate of the driving transistor T2 is set to the reference potential Vofs and the potential of the source of the driving transistor T2 is set to the second potential Vss within the no-light emitting period, the power supply line is changed over from the second potential Vss to the first potential Vcc to carry out a threshold voltage correction operation. Thereafter, while mobility correction is carried out, the signal potentials VsigN+1 to Vsig2N are written into the storage capacitors of the respective lines to cause the light emitting elements EL to emit light.

Then, the second driver applies a common control signal waveform to the sampling transistors T1(N+1) to T1(2N) within a correction preparation period and a threshold value correction period in the N+1th to 2Nth lines. Meanwhile, the difference between the signal writing time periods into pixels of adjacent lines is smaller than 1H. Further, also the difference of the timing at which the potential of the power supply line DS becomes the second potential Vss, that is, the starting timing of a no-light emitting period, between adjacent lines is smaller than 1H. After the potential of the gate of the driving transistor T2 is set to the reference potential Vofs and the potential of the source of the driving transistor T2 is set to the second potential Vss within the no-light emitting period, the power supply line is changed over from the second potential Vss to the first potential Vcc to carry out a threshold voltage correction operation. Thereafter, while mobility correction is carried out, the signal potentials VsigN+1 to Vsig2N are written into the storage capacitors of the respective lines to cause the light emitting elements EL to emit light.

Figure 16:
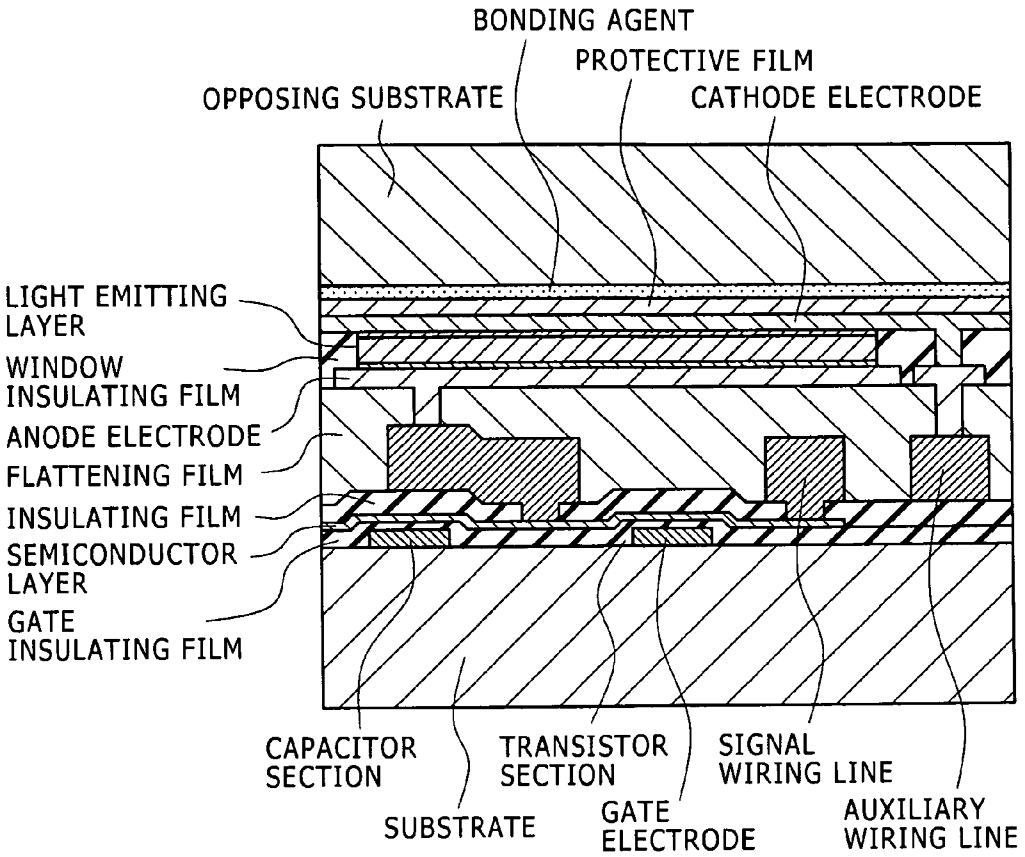
FIG. 16 is a sectional view showing a configuration of the display apparatus of FIG. 1.

The display apparatus according to the present invention has such a thin film device configuration as shown in FIG. 16. FIG. 16 shows a schematic sectional structure of a pixel formed on an insulating substrate. As seen in FIG. 16, the pixel shown includes a transistor section (in FIG. 16, one TFT is illustrated) including a plurality of thin film transistors, a capacitor section such as a storage capacitor or the like, and a light emitting section such as an organic EL element. The transistor section and the capacitor section are formed on the substrate by a TFT process, and the light emitting section such as an organic EL element is laminated on the transistor section and the capacitor section. A transparent opposing substrate is adhered to the light emitting section by a bonding agent to form a flat panel.

Figure 17:
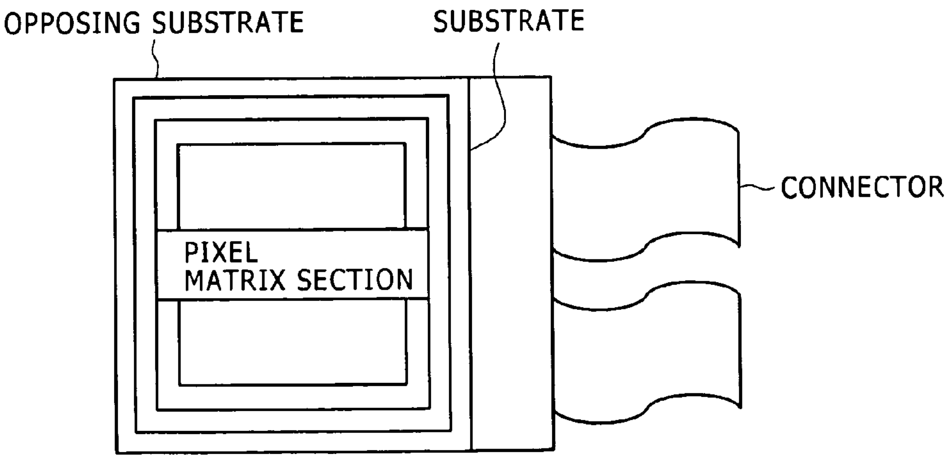
FIG. 17 is a plan view showing a module configuration of the display apparatus of FIG. 1.

The display apparatus of the present embodiment includes such a display apparatus of a module type of a flat shape as seen in FIG. 17. Referring to FIG. 17, a display array section wherein a plurality of pixels each including an organic EL element, a thin film transistor, a thin film capacitor and so forth are formed and integrated in a matrix, for example, on an insulating substrate. A bonding agent is disposed in such a manner as to surround the pixel array section or pixel matrix section, and an opposing substrate of glass or the like is adhered to form a display module. As occasion demands, a color filter, a protective film, a light intercepting film and so forth may be provided on this transparent opposing substrate. As a connector for inputting and outputting signals and so forth from the outside to the pixel array section and vice versa, for example, a flexible printed circuit (FPC) may be provided on the display module.

The display apparatus according to the present invention described above has a form of a flat panel and can be applied as a display apparatus of various electric apparatus in various fields wherein an image signal inputted to or produced in the electronic apparatus is displayed as an image, such as, for example, digital cameras, notebook type personal computers, portable telephone sets and video cameras. In the following, examples of the electronic apparatus to which the display apparatus is applied are described.

Figure 18:
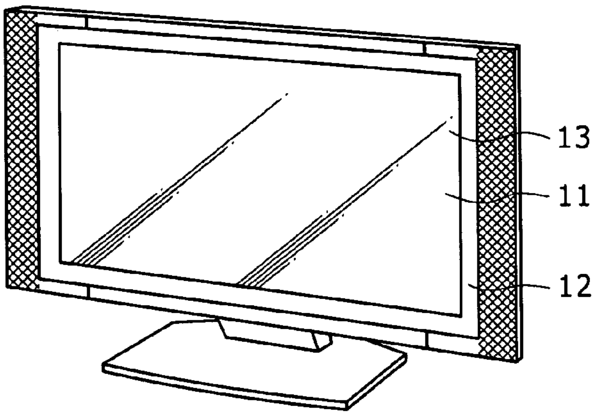
FIG. 18 is a perspective view showing a television set which includes the display apparatus shown in FIG. 1.

FIG. 18 shows a television set to which the present invention is applied. Referring to FIG. 18, the television set includes a front panel 12 and an image display screen 11 formed from a filter glass plate 3 and so forth and is produced using the display apparatus of the present invention as the image display screen 11.

Figure 19:
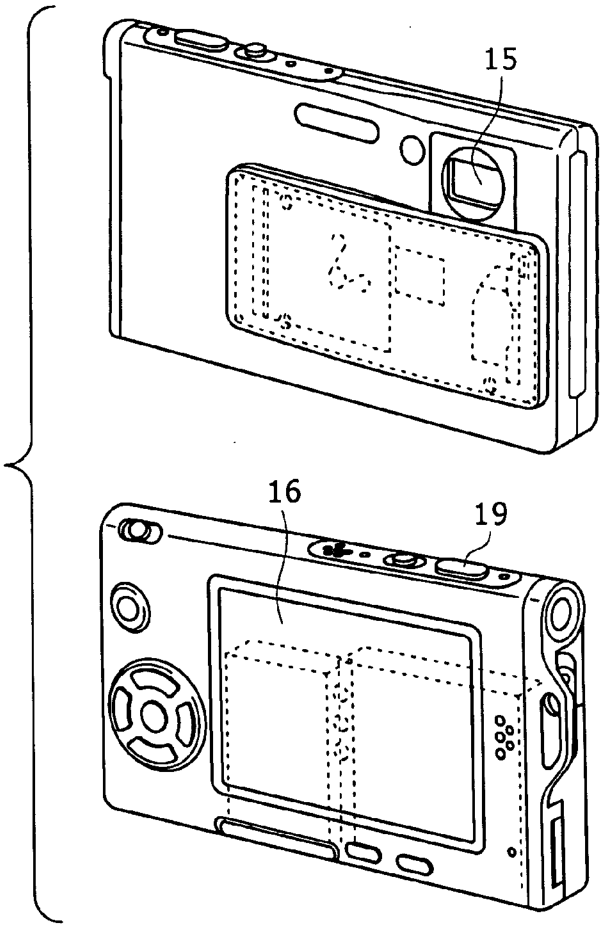
FIG. 19 is perspective views showing a digital still camera which includes the display apparatus shown in FIG. 1.

FIG. 19 shows a digital camera to which the present invention is applied. Referring to FIG. 19, a front elevational view of the digital camera is shown on the upper side, and a rear elevational view of the digital camera is shown on the lower side. The digital camera shown includes an image pickup lens, a flash light emitting section 15, a display section 16, a control switch, a menu switch, a shutter 19 and so forth. The digital camera is produced using the display apparatus of the present invention as the display section 16.

Figure 20:
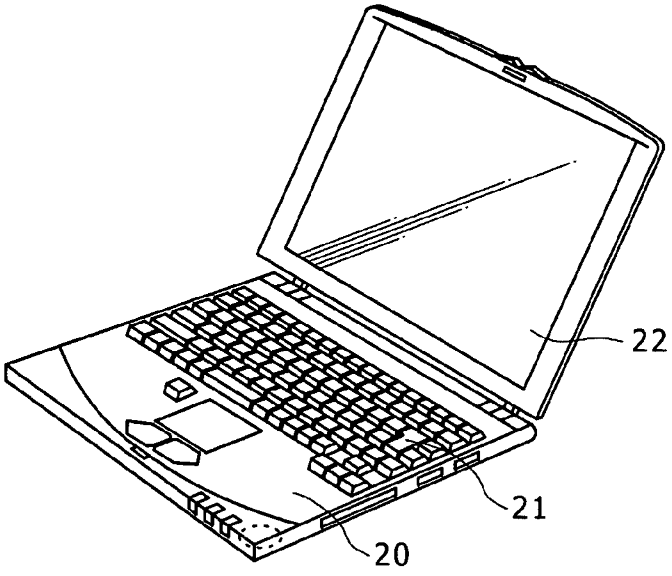
FIG. 20 is a perspective view showing a notebook type personal computer which includes the display apparatus shown in FIG. 1.

FIG. 20 shows a notebook type personal computer to which the present invention is applied. Referring to FIG. 20, the notebook type personal computer shown includes a body 20, a keyboard 21 for being operated in order to input characters and so forth, a display section 22 provided on a body cover for displaying an image and so forth. The notebook type personal computer is produced using the display apparatus of the present invention as the display section 22.

Figure 21:
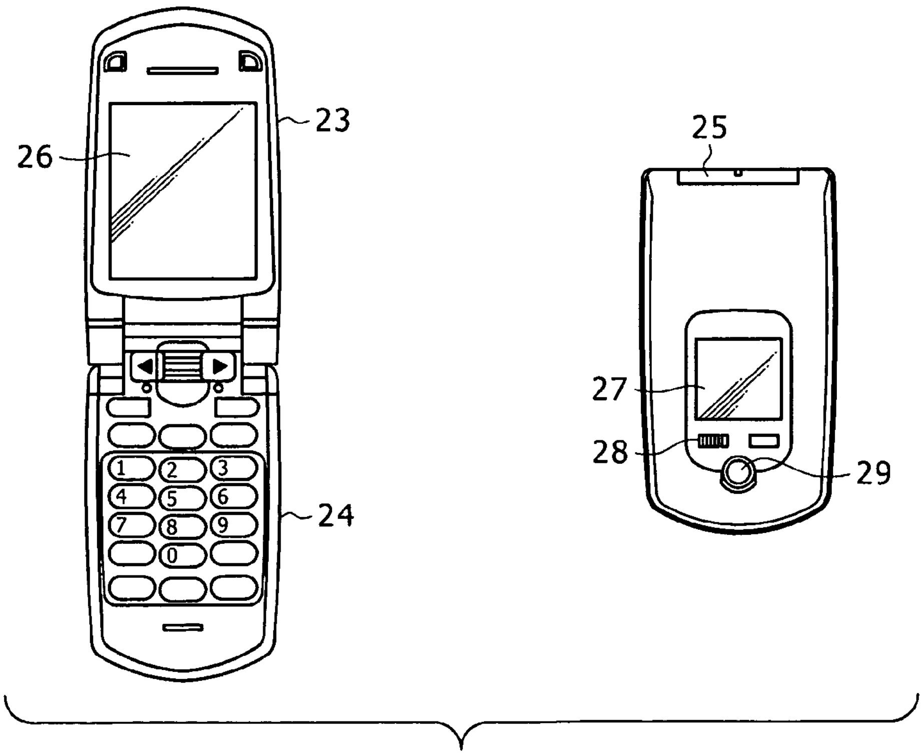
FIG. 21 is a schematic view showing a portable terminal apparatus which includes the display apparatus shown in FIG. 1.

FIG. 21 shows a portable terminal apparatus to which the present invention is applied. Referring to FIG. 21, the portable terminal apparatus is shown in an unfolded state on the left side and shown in a folded state on the right side. The portable terminal apparatus includes an upper side housing 23, a lower side housing 24, a connection section 25 in the form of a hinge section, a display section 26, a sub display section 27, a picture light 28, a camera 29 and so forth. The portable terminal apparatus is produced using the display apparatus of the present invention as the sub display section 27.

Figure 22:
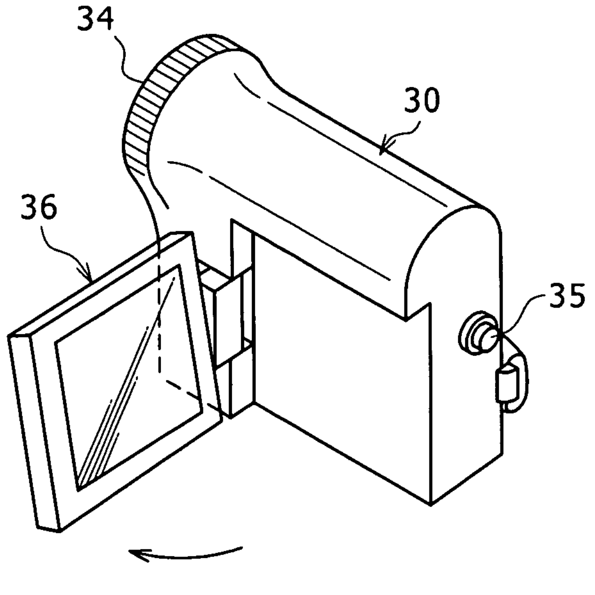
FIG. 22 is a perspective view showing a video camera which includes the display apparatus shown in FIG. 1.
Figure 23:
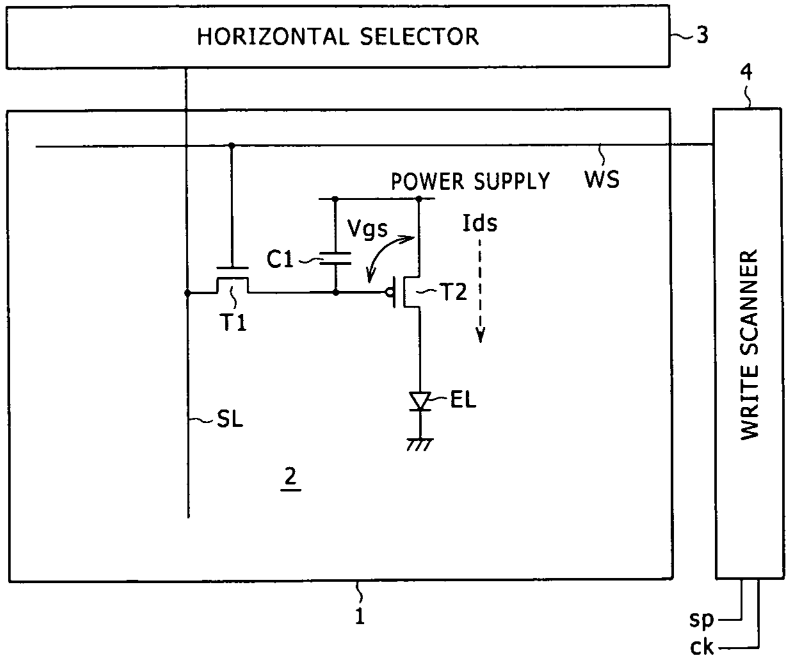
FIG. 23 is a circuit diagram showing an example of an existing display apparatus.
Figure 24:
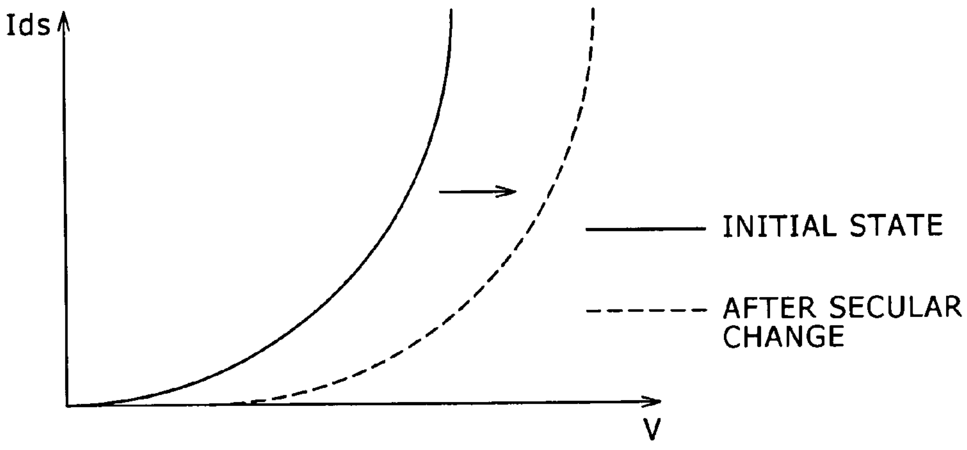
FIG. 24 is a graph illustrating a problem of the existing display apparatus of FIG. 23.
Figure 25:
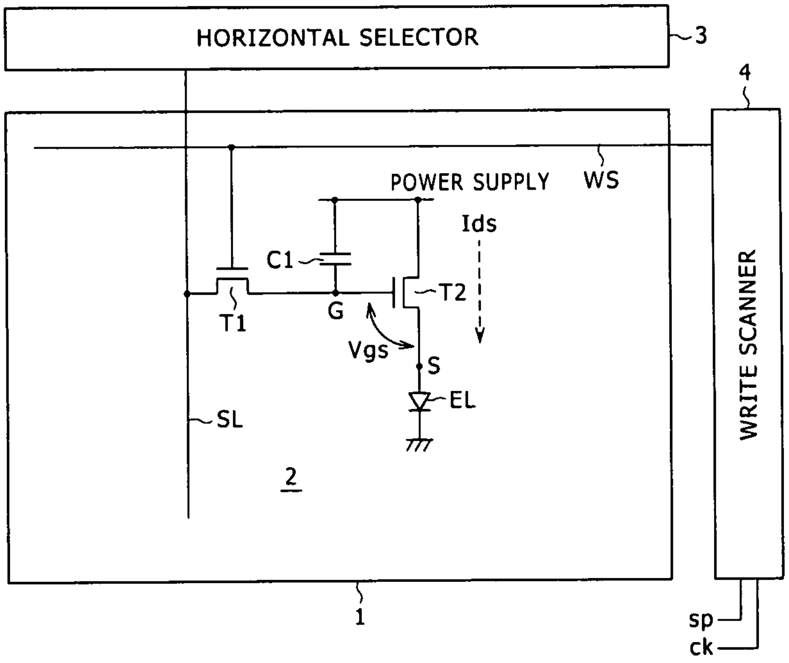
FIG. 25 is a circuit diagram showing another example of an existing display apparatus.

FIG. 22 shows a video camera to which the present invention is applied. Referring to FIG. 22, the video camera shown includes a body section 30, and a lens 34 for picking up an image of an image pickup object, a start/stop switch 35 for image pickup, a monitor 36 and so forth provided on a face of the body section 30 which is directed forwardly. The video camera is produced using the display apparatus of the present invention as the monitor 36.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising:

a pixel array section; and a driving section;

said pixel array section including a plurality of scanning lines extending along the direction of a row, a plurality of signal lines extending along the direction of a column, and a plurality of pixels disposed in rows and columns at places at which said scanning lines and said signal lines intersect with each other;

at least one of said pixels including a sampling transistor, a driving transistor, a storage capacitor and a light emitting element;

said sampling transistor connected to one of said scanning lines, one of said signal lines, and said driving transistor;

said driving transistor connected to said light emitting element;

said storage capacitor connected to said driving transistor;

said driving section including a write scanner for supplying control signals to said scanning lines;

said write scanner combining scanning periods allocated individually to plural ones of said scanning lines to form a composite scanning period that consists of a first period and a second period, the composite scanning period being two horizontal periods;

said write scanner outputting on-level control signals to said scanning lines simultaneously within the first period to execute a threshold value correction operation of said scanning lines simultaneously; and said write scanner outputting sequential on-level control signals to said scanning lines within the second period to execute a sequential signal potential writing operation, wherein said one of said signal lines provides a reference potential to the sampling transistor during the first period and a first signal potential and a second signal potential to the sampling transistor during the second period, the second signal potential being larger than the first signal potential and the first signal potential being larger than the reference potential.

2. The display apparatus according to claim 1, wherein said write scanner is composed of two or more gate drivers connected in series and each gate driver allocated to a predetermined number of ones of said scanning lines to form the composite scanning period.

3. The display apparatus according to claim 1, wherein said write scanner outputs the sequential control signals with a phase difference smaller than one scanning period to said scanning lines within the second period.

4. The display apparatus according to claim 1, wherein said pixel array section further includes feed lines disposed in parallel to said scanning lines for supplying power to a current terminal of the driving transistors while said driving section includes a power supply scanner for supplying a power supply voltage, which changes over between a high potential and a low potential, to said feed lines; and said power supply scanner supplies the low potential to said feed lines corresponding to said scanning lines to execute the threshold voltage correction operation within the first period and then switchably supplies the high potential simultaneously to said feed lines.

5. The display apparatus according to claim 4, wherein said power supply scanner supplies the low potential with a phase difference smaller than one scanning period sequentially to said feed lines within the first period and then switchably supplies the high potential simultaneously to said feed lines.

6. A method for driving a display device including a pixel array section and a driving section, the pixel array section including a plurality of scanning lines extending along the direction of a row, a plurality of signal lines extending along the direction of a column, and a plurality of pixels disposed in rows and columns at places at which the scanning lines and the signal lines intersect with each other, at least one of the plurality of pixels including a sampling transistor, a driving transistor, a storage capacitor and a light emitting element, the sampling transistor connected to one of the plurality of scanning lines, one of the plurality of signal lines, and the driving transistor, the driving transistor connected to the light emitting element, the storage capacitor connected to the driving transistor, the driving section including a write scanner for supplying control signals to the plurality of scanning lines and a signal selector for switchably supplying a signal potential and a reference potential to the plurality of signal lines, the method comprising:

outputting, by the write scanner, on-level control signals to the plurality of scanning lines simultaneously within a first period to execute a threshold value correction operation of the plurality of scanning lines simultaneously in a composite scanning period that consists of the first period and a second period, the composite scanning period being two horizontal periods and being allocated individually to plural ones of the scanning lines; and outputting, by the write scanner, sequential on-level control signals to the scanning lines within the second period to execute a sequential signal potential writing operation, and providing, by one of the plurality of signal lines, a reference potential to the sampling transistor during the first period and a first signal potential and a second signal potential to the sampling transistor during the second period, the second signal potential being larger than the first signal potential and the first signal potential being larger than the reference potential.

7. An electronic apparatus, comprising the display apparatus according to claim 1.

8. The display apparatus according to claim 4, wherein said driving section includes a signal selector configured to switchably supply a signal potential and a reference potential to said signal lines; wherein said sampling transistor is configured to carry out a threshold voltage correction operation in response to a control signal supplied to the associated scanning line when the associated signal line has the reference potential to write a voltage corresponding to a threshold voltage of said driving transistor into said storage capacitor and then a signal potential writing operation in response to a control signal supplied to the associated scanning line when the associated signal line has the signal potential to sample an image signal from the associated signal line and write the sampled image signal to said storage capacitor; and wherein said driving transistor is configured to supply current in response to the signal potential written in said storage capacitor to said light emitting element to cause said light emitting element to emit light.

9. The electronic apparatus according to claim 7, wherein said write scanner is composed of two or more gate drivers connected in series and each gate driver allocated to a predetermined number of ones of said scanning lines to form the composite scanning period.

10. The electronic apparatus according to claim 7, wherein said write scanner outputs the sequential control signals with a phase difference smaller than one scanning period to said scanning lines within the second period.

11. The electronic apparatus according to claim 7, wherein said pixel array section further includes feed lines disposed in parallel to said scanning lines for supplying power to a current terminal of the driving transistors while said driving section includes a power supply scanner for supplying a power supply voltage, which changes over between a high potential and a low potential, to said feed lines; and said power supply scanner supplies the low potential to said feed lines corresponding to said scanning lines to execute the threshold voltage correction operation within the first period and then switchably supplies the high potential simultaneously to said feed lines.

12. The electronic apparatus according to claim 4, wherein said power supply scanner supplies the low potential with a phase difference smaller than one scanning period sequentially to said feed lines within the first period and then switchably supplies the high potential simultaneously to said feed lines.

13. The electronic apparatus according to claim 4, wherein said driving section includes a signal selector configured to switchably supply a signal potential and a reference potential to said signal lines; wherein said sampling transistor is configured to carry out a threshold voltage correction operation in response to a control signal supplied to the associated scanning line when the associated signal line has the reference potential to write a voltage corresponding to a threshold voltage of said driving transistor into said storage capacitor and then a signal potential writing operation in response to a control signal supplied to the associated scanning line when the associated signal line has the signal potential to sample an image signal from the associated signal line and write the sampled image signal to said storage capacitor; and wherein said driving transistor is configured to supply current in response to the signal potential written in said storage capacitor to said light emitting element to cause said light emitting element to emit light.

* * * * *